United States Patent
Aaron

(10) Patent No.: US 8,793,682 B2
(45) Date of Patent: *Jul. 29, 2014

(54) METHODS, SYSTEMS, AND COMPUTER PROGRAM PRODUCTS FOR CONTROLLING SOFTWARE APPLICATION INSTALLATIONS

(71) Applicant: AT&T Intellectual Property I, L.P., Reno, NV (US)

(72) Inventor: Jeffrey Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,745

(22) Filed: Mar. 5, 2013

(65) Prior Publication Data
US 2013/0185713 A1  Jul. 18, 2013

Related U.S. Application Data

(63) Continuation of application No. 11/589,533, filed on Oct. 30, 2006, now Pat. No. 8,413,135.

(51) Int. Cl.
*G06F 9/45* (2006.01)
*G06F 9/445* (2006.01)

(52) U.S. Cl.
CPC .......................... *G06F 8/61* (2013.01)
USPC ........................... 717/174; 717/175; 717/176

(58) Field of Classification Search
CPC ............................................................ G06F 8/61
USPC .......................................... 717/174, 175, 176
See application file for complete search history.

(56) References Cited

U.S. PATENT DOCUMENTS

| | | | |
|---|---|---|---|
| 7,493,654 B2 | 2/2009 | Bantz et al. | |
| 7,721,281 B1 | 5/2010 | Cherepov et al. | |
| 7,730,040 B2 | 6/2010 | Reasor et al. | |
| 7,779,062 B2 | 8/2010 | Waterson | |
| 7,840,958 B1 | 11/2010 | Wan | |
| 7,934,259 B1 | 4/2011 | Kennedy | |
| 2002/0178255 A1 | 11/2002 | Hobart | |
| 2004/0025043 A1* | 2/2004 | Gallagher et al. | 713/200 |
| 2004/0034794 A1 | 2/2004 | Mayer et al. | |
| 2004/0133803 A1 | 7/2004 | Rabin et al. | |
| 2005/0223239 A1 | 10/2005 | Dotan | |
| 2006/0075502 A1 | 4/2006 | Edwards | |
| 2006/0080656 A1 | 4/2006 | Cain et al. | |
| 2007/0067844 A1* | 3/2007 | Williamson et al. | 726/24 |
| 2007/0143851 A1 | 6/2007 | Nicodemus et al. | |
| 2007/0240222 A1 | 10/2007 | Tuvell et al. | |
| 2009/0013410 A1 | 1/2009 | Kaler et al. | |
| 2009/0038011 A1 | 2/2009 | Nadathur | |

* cited by examiner

*Primary Examiner* — Phillip H Nguyen
(74) *Attorney, Agent, or Firm* — Myers Bigel Sibley & Sajovec, P.A.

(57) ABSTRACT

Methods, systems, and computer program products that automatically control the installation of software applications on a device are provided. The installation of a software application on a device is detected. The installation is temporarily halted and information about the detected software application installation is collected. A danger level of the detected software application is assessed based upon the collected information. Installation of the detected software application is allowed to continue if the assessed danger level is below a threshold level and installation of the detected software application is terminated if the assessed danger level is above the threshold level.

18 Claims, 2 Drawing Sheets

METHODS, SYSTEMS, AND COMPUTER PROGRAM PRODUCTS FOR CONTROLLING SOFTWARE APPLICATION INSTALLATIONS

RELATED APPLICATION

This application is a continuation application of U.S. patent application Ser. No. 11/589,533, filed Oct. 30, 2006, the disclosure of which is incorporated herein by reference as if set forth in its entirety.

FIELD OF THE INVENTION

The present invention relates generally to software applications and, more particularly, to the installation of software applications.

BACKGROUND

Software applications may be installed on a user's computer and/or other computing devices such as mobile PDAs, cell phones, etc., without the user fully understanding the ramifications of such installations. Oftentimes a user may not be aware that an application is being installed on his/her device. Hidden application installations are sometimes done for legitimate reasons, for example, to make things simpler for the user while adding desired capabilities or features. Unfortunately, this may have severe security implications since critical security protection mechanisms (e.g., firewalls and anti-virus/spyware/malware programs) need to block the activities of unauthorized applications in order to protect the user from harm. Hackers often install applications on user devices without the user's knowledge thereof in order to misuse the user's computer and obtain private data.

Accordingly, there is a need to be able to identify legitimate applications from unauthorized applications, and to be able to give users more control over application installations, if they desire such control, and in any case to help prevent any installation of unauthorized applications.

SUMMARY

Embodiments of the present invention provide methods, systems, and computer program products that automatically control the installation of software applications on a device. According to some embodiments of the present invention, a method of controlling the installation of software applications on a device includes detecting installation of a software application on a device and then pausing the detected software application installation. Information about the detected software application installation is collected, and a danger level of the detected software application is assessed based upon collected information and other pre-stored data including pre-configured rules, parameters, and database information. Installation of the detected software application is allowed to continue if the assessed danger level is below a threshold level and installation of the detected software application is stopped if the assessed danger level is above the threshold level. Software application installation may be detected in various ways including, but not limited to, detecting changes in a device's registry, detecting file system changes via the operating system functionality, and/or detecting the backing up of files on a device. Information collecting may include collecting one or more of the following types of information: software application name, software application version, software application size, software application date, software application format, software application source, software application installer, target directory on the device, logged communications between the device and other devices. Information collecting may include monitoring communications between a device and other devices, and may include requesting information about the detected software application installation from a user of the device.

Assessing a danger level of a detected software application may include comparing how similar the detected software application is to one or more of the following known types of dangerous applications: viruses, spyware, malware. Assessing a danger level of the detected software application may include determining one or more of the following: whether the software application is attempting to access sensitive and/or private data locations on the device, whether the software application is using a stealth communication method to install on the device, whether the software application is configured to access and/or utilize sensitive memory portions of the device, whether the software application is configured to access and/or utilize hard drive portions of the device including sensitive directories, whether the software application is configured to execute at a highly privileged operator level of the device such as "root" or "administrator," whether the device has previously communicated with a suspicious web site, etc.

Embodiments of the present invention may reside on a user device, on a remote device accessible via a network, such as the Internet, and/or on both a user device and a remote device. According to some embodiments of the present invention, a network service is provided that a user can subscribe to for detecting and verifying software application installations on the user's device. Upon subscribing to the network service, an agent is downloaded to the user's device. The agent is configured to automatically detect an application installation, gather associated data and forward the information to the network service. The network service is configured to analyze the impending installation, predict potential security impacts, determine whether the application is likely to be undesirable (i.e., verify that the installation should be allowed), optionally allow the user to provide input into the determination process, and either allow or disallow the installation of that application.

Thus, if the user so desires, the user can be given more visibility into what is installed (especially prior to installation), such that the user is no longer at the mercy of hidden installation events, ignorant of what applications reside on the user's device. Moreover, even if the user does not wish to be bothered, software application installations can be automatically monitored, examined, and thus appropriately allowed or disallowed.

According to some embodiments of the present invention, upon a request from a user, the user can be provided with a list of all installed applications along with useful descriptive information and relevant security ramifications and installation information, thus giving the user more of a feeling of ownership and control over their device. Moreover, embodiments of the present invention enable a user to be confident that all of the installed applications on a device are truly authorized, as opposed to many applications which are currently installed without the user's knowledge, understanding, oversight, or even any oversight or assurance that the installation was for the benefit of the user rather than the benefit of another party such as a spyware company or manufacturer wishing to accomplish ends not particularly for the user's good.

Other methods, apparatus and/or computer program products according to embodiments of the invention will be or become apparent to one with skill in the art upon review of the following drawings and detailed description. It is intended that all such additional methods, apparatus, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION

Figure 1:
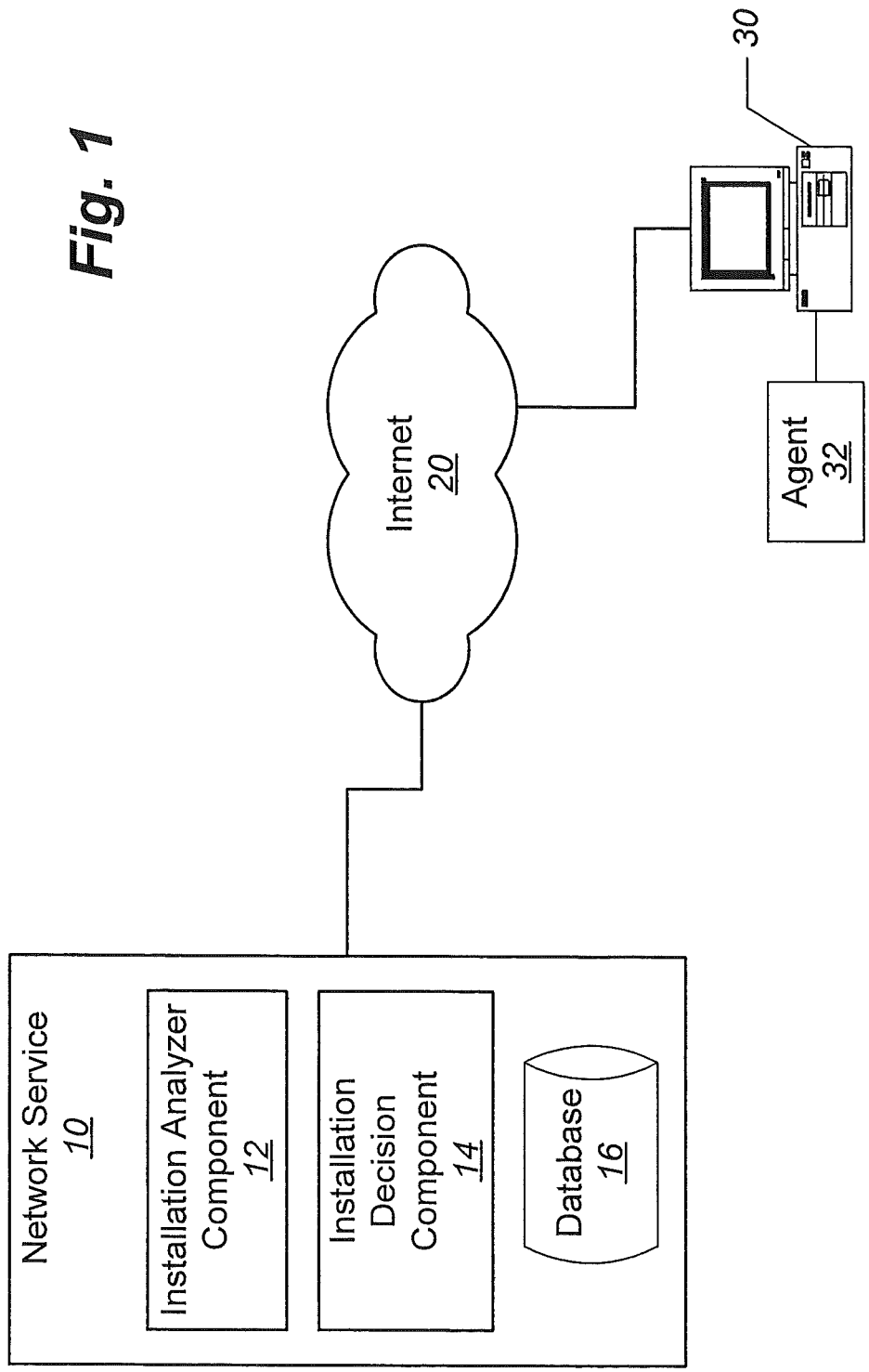
FIG. 1 is a block diagram that illustrates an exemplary network service in communication with a communication network that is configured to control the installation of software applications on a user device, according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for selecting advertisements for insertion into advertising slots in broadcast content, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The term "root level directory", as used herein, refers to the directory that includes all other directories in a computer file system that is organized as a hierarchy or tree.

The term "agent", as used herein, refers to a program (or programs) that executes on a user device and that gathers information and/or performs some service, typically without requiring a user's presence or knowledge.

The present invention may be practiced within a client/server programming environment. As is known by those skilled in this art, client/server is a model for a relationship between two computer programs in which one program, the client program, makes a service request from another program, the server program, which fulfills the request. Relative to the Internet, a Web browser is a client program that requests services (the sending of Web pages or files) from a Web server (which technically is called a Hypertext Transport Protocol or HTTP server) in another computer somewhere on the Internet.

FIG. 1 is a block diagram that illustrates a network service 10 in communication with a communication network 20 and that is configured to control the installation of software applications on a user device 30, according to some embodiments of the present invention. The communication network 20 may be the Internet, an intranet, or any other private/public communication network. Although illustrated as a personal computer (PC), user device 30 represents any type of device that is configured to run software applications on which software applications can be installed including, but not limited to, servers, personal digital assistants (PDAs), hand-held computers, laptop computers, Internet-ready phones, etc. User device 30 may communicate directly with the communication network 20 and/or may communicate wirelessly therewith.

According to some embodiments of the present invention, the user device includes an agent 32 that is configured to detect the installation of a software application on the device 30. Software application installation can be detected in various ways by the agent 32. For example, in a device employing one of the Microsoft® Windows® operating systems, the agent 32 may be configured to detect changes in the device's registry. As known to those skilled in the art, a registry is a single place for keeping device information, such as what hardware is attached to the device, what system options have been selected, how device memory is set up, what application programs are to be present when the operating system is started, etc. In addition, the agent 32 may be configured to detect when files on the device 30 are being backed up. The backing up of files can indicate that a software application is being installed or about to be installed. Additionally, many operating systems include features that allow events to be monitored and/or checked for via "calls" to the operating system and/or other similar functionality, such that these methods can be used to detect actions that are typically part of a software installation process. Operating system calls can also be monitored using well-known software engineering techniques, for instance by installing a special software "shim" that inserts itself between the operating system and all other software so as to intercept/monitor all calls to the operating system, thus directly detecting software installation events. For instance, the process of initiating an installation "wizard" or other type of installer can be monitored, as can the sequences of actions comprising an installation. The creation of additional directories can be also detected. Precursor actions to an installation, such as processor-intensive unpacking of a compressed file to obtain installation components in usable form, can be detected directly or be checked for when processor loading exceeds a threshold typical of such processing actions. Alternately or additionally, operating system functionality can be periodically used to directly check for changes typically indicative of a software installation, and if this is done frequently then the installation can be caught in the early stages.

Once detected, the agent 32 is configured to suspend or pause the application installation. The agent 32 is configured to collect various information about the detected software application installation and to communicate this information to the network service 10. The agent 32 may collect various types of information about the software application being installed including, but not limited to, software application name, software application version, software application size, software application date, software application format, software application source, software application installer, target directory or directories on the user device, logged communications between the user device 30 and other devices (e.g., other devices in communication with the communication network 20), etc. This information may be collected directly from the device 10 and/or from other devices. In addition, the agent 32 may be configured to monitor communications between the device 30 and other devices, for example, other devices connected to the Internet 20, other devices in direct communication with device 30, etc. In a manner similar to one of the ways of detecting software installations, monitoring of device communications is typically accomplished via the installation of a software "shim" that inserts itself between the operating system network communication portion, also called the network "stack," and the software which is communicating. Monitoring software employing this technique is widely used and is often referred to as a "sniffer," whereas the monitoring of the communications is often referred to as "sniffing."

According to some embodiments of the present invention, the agent 32 may also be configured to request and receive input from a user about the software application installation on the device 30. For example, if a user's profile indicates that the user wants to participate in decisions regarding the installation of software on his/her device, the agent 32 is configured to solicit information from the user. For example, the agent may be configured to ask a user what tasks he/she is currently performing, e.g., is the user trying to download music files from the Internet, working on a word processing document, etc.

The agent 32 is configured to communicate information collected from a user to the network service 10. However, user participation is not required. According to some embodiments of the present invention, software application installations can be automatically monitored, examined and allowed or disallowed without any user involvement.

According to some embodiments of the present invention, the network service 10 includes a software application installation analyzer component 12, a software application installation decision component 14, and a database 16 (or is configured to access a database 16). The database 16 contains analysis rules, analysis-relevant data and user profile data for a user of device 30. The database 16 may also be used to log information about software application installations on the device 30.

The analyzer component 12 is configured to receive information from the agent 32 about a software application installation and to analyze the information and assess the danger level of the detected software application. Analysis may be performed in various ways. For example, the analyzer component 12 may retrieve various rules from the database 16 and apply the collected data from the agent 32 to these rules. The term "rules" is intended to include, but not be limited to, signature detection, "if/then" rules, algorithms, pattern matching techniques, look-ups including table look-ups, decision tree approaches and/or other processing/computational methods, etc. Signature detection inspects software to see if it contains snippets of data that have previously been found in a virus, malware, or spyware, and which have been determined to be rarely found in other software. But in addition to detecting signatures as is done to directly identify viruses, malware, and spyware, the other types of rules can be used to help estimate a level of danger associated with any software about to be installed, particular when there is no certain determination that the software is a virus, malware, or spyware. Such techniques are sometimes referred to as "heuristic" when done to detect viruses for which signatures are not yet available, and at least some of these sorts of rule-based detection techniques are already employed in anti-virus products. Similarity to known viruses, malware, and spyware can be measured using a variety of known statistical and software-related methods. Further, some types of rules utilize conditional determinations, such as look-ups and decision trees which determine the previous and/or simultaneous presence of multiple items which, taken together, can have a significant predictable effect upon the potential danger level of installing a particular type of additional software. During analysis, it may also be necessary to obtain additional information from the user device and/or from a user. In this case, the network service 10 may also be configured to request additional information from the agent 32 and/or may also be configured to request additional information from the user.

In some instances, the analyzer component 12 may be able to identify whether a software application is clearly okay to install without requiring that a detailed analysis occur. For example, for certain users in a department of a company, it may be clear that installation of a particular application is okay and vice-versa. Similarly, there may be instances where the analyzer component 12 will clearly know that a software application should not proceed on a user device without requiring a detailed analysis. The analyzer component 12 is configured to notify the agent 32 to allow installation of a software application when it is clearly okay to do so, and to notify the agent 32 to terminate installation of a software application when it is clearly okay to do so.

According to some embodiments of the present invention, the analyzer component 12 can become "smart" over time and can advise a user to just let a program load because the analyzer component 12 has seen the particular application or type of application before and knows that it is okay to install, especially if many previous installations have been allowed without any reports of subsequent complaints or problems.

The analyzer component 12 is configured to assess a danger level of the detected software application and assign a score to the software application that corresponds to the assessed danger level (e.g., a danger scale may be from 1 (safe) to 10 (dangerous)). The analyzer component 12 may be configured to assess a danger level of detected software application by, for example, comparing how similar the detected software application is to one or more of the following known types of dangerous applications: viruses, spyware, malware, etc. In addition, the analyzer component 12 may be configured to assess a danger level of the detected software application by determining one or more of the following: whether the software application is attempting to access sensitive and/or private data locations on the device 30, whether the software application is using a stealth communication method to install on the device 30, whether the software application is configured to execute at a root directory level of the device 30, whether the software application is configured to execute at an administrator level or privileged level directory of the device 30, whether the software application is configured to access and/or utilize sensitive memory portions of the device 30, whether the software application is configured to access and/or utilize hard drive portions of the device 30 including sensitive directories, whether the software application is configured to execute at a highly privileged operator level of the device 30 such as "root" or "administrator," and/or whether the device 30 has previously communicated with a suspicious web site. The size of a software application also may be indicative of whether the application is dangerous or not. For example, if a software application is much larger than it should be for the function it is supposed to provide, this may be an indication that the application is dangerous (e.g., it may be spyware, etc.). Additionally, if the installation attempts to modify portions of memory and/or storage devices that seem unrelated or much more extensive than is typical, and/or if the installation attempts to install software "shims" such as "sniffers" or other monitors in between legitimate software layers, and/or if the installation attempts to modify already-installed software, and/or if the software installation attempts to install a type of software that may be particularly dangerous due to especially sensitive applications already installed, these may be indications of a dangerous application. Note that software "shims" can modify actions as well as modify them, which is particularly dangerous if misused.

The illustrated network service 10 includes a installation decision component 14 that receives the assessed danger level of a software application from the installation analyzer component 12 and then makes a decision whether to allow or disallow installation of a software application. For example, a danger level threshold may be established above which an application is not allowed to be installed. For example, if a danger level threshold of 5 is established, the installation of any software applications with a danger level of 5 or below will be allowed and the installation of any software applications with a danger level greater than 5 will be terminated. As another example, the installation decision component 14 may block installation if a danger level is 8 or above, and may allow installation to continue if the danger level is 3 or below. However, if the danger level is between, for example, 4 and 7, the network service 10 may ask the user what the user wants to do (assuming the user has indicated he/she wants to provide input). A danger level threshold may be established using various parameters and need not be the same for all software applications.

The installation decision component 14 may also be configured to retrieve user profile data and, if appropriate, request input from a user of the device 30 about a software application installation. The installation decision component 14 is configured to use received user input along with an assessed danger level to make a decision whether to allow a software application to be installed on the device 30 or whether to terminate installation. The installation decision component 14 is configured to communicate its decision to the agent 32 at the user device 30.

The agent 32 implements the decision of the installation decision component 14 i.e., the agent 32 either allows the software application installation to proceed or terminates the previously halted installation process. In addition, the agent 32 may be configured to log the decision whether to proceed with installation or terminate installation. The network service 10 may also be configured to log the decision whether to proceed with installation or terminate installation, for example, within the database 16.

According to some embodiments of the present invention, the agent 32 may be configured to restore a user device to a pre-installation condition. For example, if an application installation has modified/added/deleted files on the user device prior to being halted, the agent 32 may be configured to return the files to their pre-installation condition if the installation is terminated.

Embodiments of the present invention are not limited to the above-delineated configurations of the network service 10 and agent 32. One or more of the above-described tasks may be performed by the network service 10, agent 32 and/or by both the network service 10 and agent 32. For example, the agent 32, or a user device itself, may be configured to detect the installation of a software application, temporarily halt the installation, collect information about the software application (including information from a user), analyze the collected information to determine a danger level, and either resume installation or terminate installation of the software application.

Exemplary operations for controlling the installation of software applications on a device, according to some embodiments of the present invention, will now be described with reference to FIG. 2. Initially, the installation of a software application on a device is detected (Block 100), for example, by detecting changes to the device registry, by detecting files on the device being backed up, etc.

The detected software application installation is halted temporarily (Block 110) and information about the detected software application installation is collected (Block 120). As described above, collecting information may include monitoring communications between the device and other devices. Collecting information may also include collecting one or more of the following types of information: software application name, software application version, software application size, software application date, software application format, software application source, software application installer, target directory on the device, logged communications between the device and other devices, etc. Collecting information may include collecting information from a user of the device.

Using the collected information, the danger level of the detected software application is assessed (Block 130). As described above, assessing a danger level of a software application may include comparing how similar the detected software application is to a virus, to spyware, and/or to malware. Assessing a danger level of the detected software application may also include determining whether the software application is attempting to access sensitive and/or private data locations on the device, whether the software application is using a stealth communication method to install on the device, whether the software application is configured to execute at a root directory level of the device, whether the software application is configured to execute at an administrator level or privileged level directory of the device, whether the software application is configured to access and/or utilize sensitive memory portions of the device, whether the software application is configured to access and/or utilize hard drive portions of the device including sensitive directories, whether the software application is configured to execute at a highly privileged operator level of the device such as "root" or "administrator," and/or whether the device has previously communicated with a suspicious web site, etc.

If the danger level of the detected software application exceeds a threshold level (Block 140), the installation of the software application is terminated (Block 150). If the danger level of the detected software application does not exceed a threshold level (Block 140), the installation of the software application is allowed to proceed (Block 160). In either case, prior to allowing the installation to proceed or prior to terminating installation, user input may be requested if the user so desires.

Figure 2:
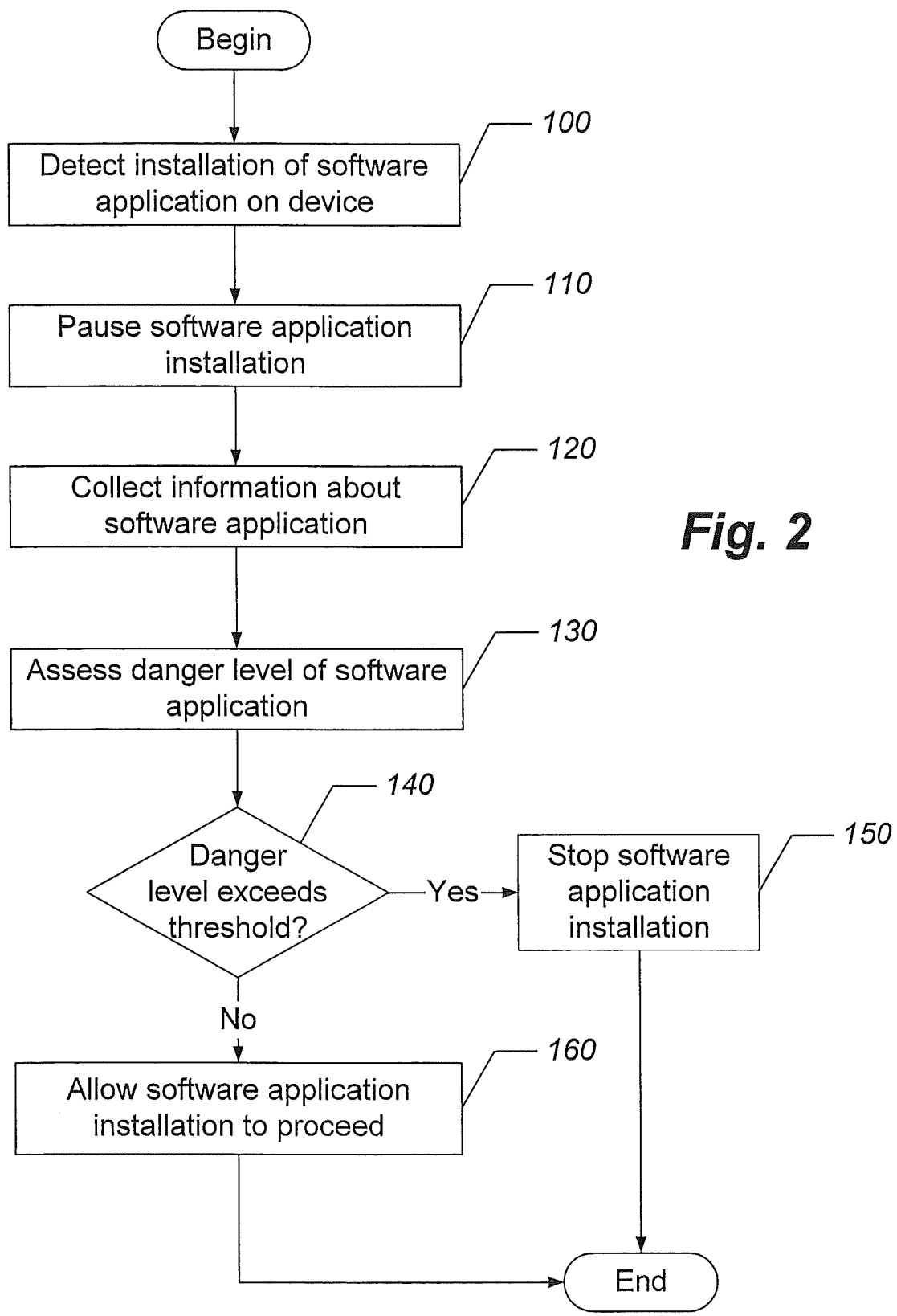
FIG. 2 is a flow chart that illustrates exemplary operations for controlling the installation of software applications on a device, according to some embodiments of the present invention.

FIGS. 1-2 illustrate the architecture, functionality, and operations of some embodiments of methods, systems, and computer program products for controlling the installation of software applications on user devices. In this regard, each block represents a module, segment, or portion of code, which comprises one or more executable instructions for implementing the specified logical function(s). It should also be noted that in other implementations, the function(s) noted in the blocks may occur out of the order noted in FIG. 2. For example, two blocks shown in succession may, in fact, be executed substantially concurrently or the blocks may sometimes be executed in the reverse order, depending on the functionality involved.

EXAMPLE

Andrew is attempting to install a new game on his PC, and has previously subscribed to a security verification service (i.e., network service 10, FIG. 1) offered by his Internet provider which installed software (i.e., agent 32, FIG. 1) from its web site onto Andrew's PC. The installation begins but is halted by the verification software client/agent on his PC. Andrew sees a pop-up that says "Application install being checked and verified". The software agent collects relevant information, including noting that Andrew's PC just communicated with a gaming web site using certain ports/protocols.

The agent sends the relevant info to an analyzer component of the network service, which applies rules and utilizes the information to determine that it appears that a new racing game is attempting to install on Andrew's PC, and that the game is produced by a particular game company associated with the web site his PC just contacted. The analyzer component assesses the danger level of the game to be 6 on a 1-to-10 scale, i.e., the game is "moderately dangerous." The analyzer component so instructs the installation decision component, which applies additional rules and accesses Andrew's profile (which he previously configured using the verification service web site, from which he downloaded the agent) to determine that Andrew wishes to be consulted whenever danger levels of 4 or greater are encountered.

The decision component sends an input request to the agent on Andrew's PC which, via a pop-up, informs Andrew that the danger level is 6 and it appears a certain racing game is installing, to which Andrew replies "ok to install."

The decision component, upon receiving Andrew's "ok," notifies the agent to allow the install, so the agent un-suspends the installation process and logs the installation.

During installation of the game, some spyware bundled with the game attempts to install on Andrew's PC. The agent collects this information and forwards to the analyzer component which is able to easily match to known spyware. The decision component instructs the agent to prevent the installation of the spyware, without even bothering Andrew to provide any input.

Many variations and modifications can be made to the preferred embodiments without substantially departing from the principles of the present invention. All such variations and modifications are intended to be included herein within the scope of the present invention, as set forth in the following claims.

That which is claimed:

1. A computer-implemented method of controlling an installation of a software application on a device, the method being performed by at least one processor and comprising:
    detecting the installation of the software application on the device comprising one of detecting files on the device being backed up and detecting creation of at least one additional file directory;
    pausing the installation;
    collecting information about the installation;
    assessing a danger level of the software application based upon the information, comprising comparing how similar the software application is to known types of dangerous applications which include viruses, spyware, and malware, determining whether the software application is using a stealth communication method to install on the device, and determining whether the device has previously communicated with a suspicious web site; and
    allowing the installation of the software application to continue if the danger level is below a threshold level.

2. The method of claim 1, wherein collecting information includes name of the software application, version of the software application, source of the software application, installer of the software application, and logged network communications between the device and other devices.

3. The method of claim 1, wherein collecting information comprises monitoring communications between the device and other devices.

4. The method of claim 3, wherein the device is in communication with a network and wherein the other devices are also in communication with the network.

5. The method of claim 1, further comprising requesting information about the installation from a user of the device.

6. The method of claim 1, further comprising requesting information from the user regarding what task the user is currently performing.

7. The method of claim 5, wherein prior to requesting information from the user, a profile of the user is reviewed to determine if the user wants to provide input on software application installations.

8. The method of claim 1, further comprising displaying on the device a danger scale and a danger level of the software application.

9. A system that controls an installation of a software application on a device, comprising:
    a processor;
    a memory coupled to the processor; and
    computer program code residing in the memory that, when executed by the processor, causes the processor to perform operations comprising:
    detecting the installation of the software application on the device comprising one of detecting files on the device being backed up and detecting creation of at least one additional file directory;
    pausing the installation;
    collecting information about the installation;
    assessing a danger level of the software application based upon the information, comprising comparing how similar the software application is to known types of dangerous applications which include viruses, spyware, and malware, determining whether the software application is using a stealth communication method to install on the device, and determining whether the device has previously communicated with a suspicious web site; and
    allowing the installation of the software application to continue if the danger level is below a threshold level.

10. The system of claim 9, wherein collecting information includes name of the software application, version of the software application, source of the software application, installer of the software application, and logged network communications between the device and other devices.

11. The system of claim 9, wherein collecting the information comprises monitoring communications between the device and other devices.

12. The system of claim 11, wherein the device is in communication with a network and wherein the other devices are also in communication with the network.

13. The system of claim 9, further comprising providing a list of software applications installed on the device that includes a description of security information about each installed application.

14. The system of claim 9, further comprising requesting information about the software application installation from a user of the device.

15. The system of claim 9, further comprising requesting information from the user regarding what task the user is currently performing.

16. The system of claim 14, wherein prior to requesting information from the user, a profile of the user is reviewed to determine if the user wants to provide input on software application installations.

17. The system of claim 9, further comprising displaying on the device a danger scale and a danger level of the software application.

18. A computer program product for controlling an installation of software applications on a device, comprising:
    a non-transitory computer readable medium comprising computer readable program code that when executed by a processor causes the processor to perform operations comprising:
    detecting the installation of the software application on the device comprising one of detecting files on the device being backed up and detecting creation of at least one additional file directory;
    pausing the installation;
    collecting information about the installation;
    assessing a danger level of the software application based upon the information, comprising comparing how similar the software application is to known types of dangerous applications which include viruses, spyware, and malware, determining whether the software application is using a stealth communication method to install on the device, and determining whether the device has previously communicated with a suspicious web site; and
    allowing the installation of the software application to continue if the danger level is below a threshold level.

* * * * *